(12) United States Patent
Kalil

(10) Patent No.: US 8,251,006 B2
(45) Date of Patent: Aug. 28, 2012

(54) VESSEL TRIM-TABS WITH PIVOTAL CONNECTION

(75) Inventor: Anthony Kalil, Palm City, FL (US)

(73) Assignee: Anthony Kalil, Palm City, FL (US)

( * ) Notice: Subject to any disclaimer, the term of this patent is extended or adjusted under 35 U.S.C. 154(b) by 177 days.

(21) Appl. No.: 12/626,280

(22) Filed: Nov. 25, 2009

(65) Prior Publication Data

US 2010/0186655 A1   Jul. 29, 2010

Related U.S. Application Data

(60) Provisional application No. 61/117,773, filed on Nov. 25, 2008.

(51) Int. Cl.
*B63B 1/22* (2006.01)
(52) U.S. Cl. ........................................................ 114/285
(58) Field of Classification Search ................. 114/271, 114/274, 278, 280, 284, 285
See application file for complete search history.

(56) References Cited

U.S. PATENT DOCUMENTS

| | | | | |
|---|---|---|---|---|
| 2,832,304 | A * | 4/1958 | Elyosius et al. | 114/280 |
| 3,391,667 | A * | 7/1968 | Lo Bue | 114/285 |
| 7,174,843 | B1 * | 2/2007 | Tossavainen | 114/284 |
| 7,707,956 | B2 * | 5/2010 | Moore | 114/284 |

* cited by examiner

*Primary Examiner* — Daniel Venne
(74) *Attorney, Agent, or Firm* — Saliwanchik, Lloyd & Eisenschenk

(57) ABSTRACT

A trim tab apparatus capable of causing the stern of a vessel to be raised or lowered relative to the surface of the water in which it rests. A trim tab plane can be pivotally attached to one or more arms that can be attached to a vessel by one or more brackets. When the trim tab plane is rotated in an aft direction as a vessel is moving, the force of water passing under the trim tab plane causes the vessel stern to be raised. If the trim tab planes are rotated in a fore direction as the vessel is moving, water is forced across the top of the trim tab planes causing stern-drag, so that the vessel stern is lowered in the water.

11 Claims, 2 Drawing Sheets

VESSEL TRIM-TABS WITH PIVOTAL CONNECTION

CROSS-REFERENCE TO RELATED APPLICATION

The present application claims the benefit of U.S. Provisional Application Ser. No. 61/117,773, filed Nov. 25, 2008, which is hereby incorporated by reference in its entirety, including any figures, tables, or drawings.

BACKGROUND OF INVENTION

Vessel trim tabs usually consist of one, usually two, independently adjustable trim planes mounted on the transom of a vessel. They are designed to provide lift in order to compensate for changes in speed, weight distribution, and water conditions. When deflected downward, the water force on the trim tab creates upward pressure, raising the stern. The surface area of the tab, the angle of deflection and the speed of the vessel all contribute to greater stern lift. When properly adjusted the trim tabs allow a moving vessel hull to be oriented generally parallel with the water surface reducing hull resistance. Trim tabs can be especially useful on planing-type vessels.

However, in some situations, it is more desirable for the stern of a vessel to sit lower in the water when in motion, usually referred to as "stern drag." For example, when pulling a water skier behind a vessel, it is easier to pull the skier to a standing position if the stern of the boat is below the water line during the initial start-up.

Standard trim tabs are designed to rotate from zero to approximately 45° relative to the stern of a vessel. The rotation of the trim tab adjusts the stern of a vessel upward to plane the hull as necessary. But, standard trim tabs are not designed to lower the stern of a vessel.

BRIEF SUMMARY

The subject invention provides an improved trim tab apparatus having a dual rotation that can when rotated in one direction adjust the stern of a vessel upwards (as with prior art trim tabs), but is also rotatable in the opposite direction such that when rotated in the opposite direction can adjust the stern downward by ploughing down into the water increasing stern drag. The trim tab apparatus of the subject invention comprises a generally flat trim plane pivotally attached at or near the center to one or more arms that are fixedly attached to the vessel. In an embodiment, the movement of the subject trim tab resembles that of a see-saw. When the aft end is pivoted downward, the vessel hull can be "trimmed" to sit generally parallel to the water surface when in motion. But, when the fore end is pivoted downward, there is sufficient resistance, or "stern drag" created as it ploughs into the water when the vessel is in motion to cause the stern of the vessel to be pulled downward so that it sits lower than the water surface.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. Understanding that these drawings depict only typical embodiments of the invention and are not therefore to be considered as limiting in scope, the invention will be described and explained with additional specificity and detail through the use of the accompanying drawings in which.

DETAILED DISCLOSURE

The subject invention in general describes embodiments of a vessel trim tab apparatus. More specifically, the subject invention pertains to one or more embodiment(s) of a vessel trim tab apparatus, or similar device, capable of adjusting the stern of a boat upward or downward relative to the surface of the water.

The following description will disclose that the subject invention is particularly useful for marine vessels. However, a person with skill in the art will be able to recognize numerous other uses that would be applicable to the devices and methods of the subject invention. While the subject application describes embodiments and uses for adjusting the plane of a vessel in open water, other modifications and uses will be apparent to a person with skill in the art and benefit of the subject disclosure. Such alternatives are contemplaned to be within the scope of the present invention.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

With reference to the attached figures, which show certain embodiments of the subject invention, it can be seen that a trim tab apparatus 10 of the subject invention comprises trim tab plane 20 pivotally attached to at least one arm 30 by which the trim tab is fixedly attached to a vessel. In a further embodiment, the arm 30 is attached to a bracket 40 that attaches the trim tab apparatus 10 to a vessel.

Figure 1:
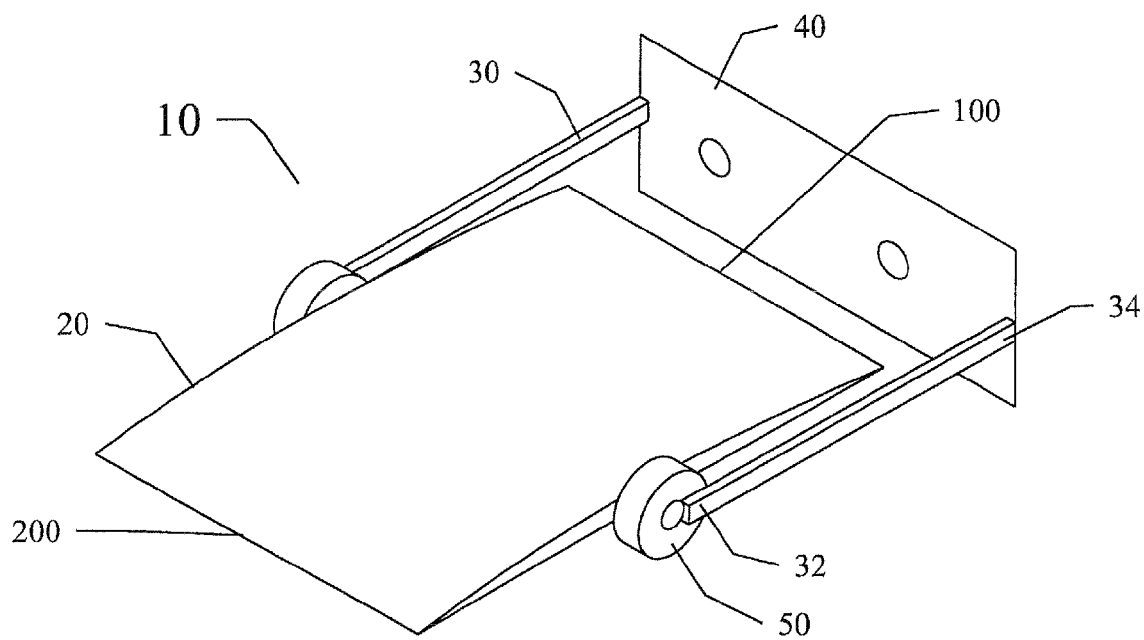
FIG. 1 is an illustration of one embodiment of a trim tab of the subject invention where the connecting arm connects to either side of the trim tab. In this embodiment, the trim tab rotates between the connecting arm.

The trim tab plane 20 is, in general, a planar surface with at least a top side 22 and a bottom side 24 for deflecting and/or directing passing water. A trim tab of the subject invention can comprise any of a variety of shapes and configurations for variously deflecting and/or directing water as it passes over or under the trim tab plane. In one embodiment, shown, for example, in FIG. 1, the trim tab plane is essentially a four-sided planar surface. In a further embodiment, the top side 22 and/or bottom side 24 is curvilinear, for example as shown in FIG. 1. In a still further embodiment, one or more edges 26 are curvilinear, as shown, for example, in FIG. 2.

The trim tab plane of the subject invention is rotatably affixed to a first end 32 of at least one arm(s) 30. The arm 30 can be attached to the trim tab plane 20 by any of a variety of rotational devices 50 that will provide sufficient rotational freedom to the trim tab plane. In one embodiment, shown, for example, in FIGS. 1 and 2, the trim tab plane 20 is attached to the arm by one or more pivot pins 52 that pivotally join the trim tab plane at or near a first end of the arm. The pivotal attachment of the trim tab plane 20 to the one or more arms 30 of the subject invention can be accomplished by any suitable method, technique, or device presently or prospectively known to those skilled in the art. All such variations are contemplaned to be within the purview of the subject invention.

In one embodiment, the trim tab apparatus 10 comprises dual arms, for example, as shown in FIG. 1, that attach to two, generally opposite sides, of the trim tab plane. The arms can be attached anywhere along the sides of the trim tab plane depending upon a variety of factors such as the length of the trim tab plane, the vessel style or size, the location of the trim tab apparatus on the vessel hull, as well as other factors known to those with skill in the art. In one embodiment, the arms 30 are attached at or near the center of the sides of the trim tab planes. In an alternative embodiment, the arms 30 can be attached nearer to the fore end 100 or aft end 200 of the trim tab planes.

Figure 2:
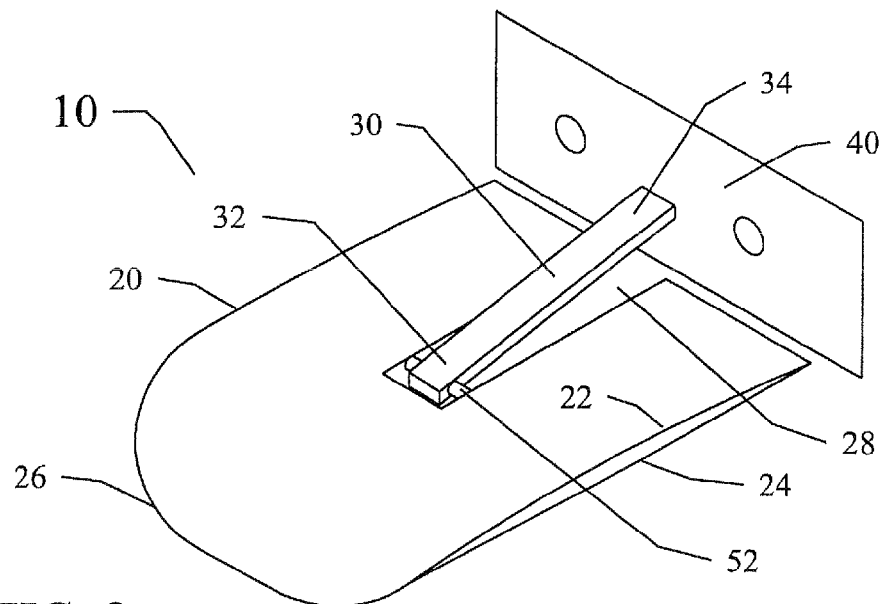
FIG. 2 is an illustration of another embodiment of a trim tab of the subject invention where the connecting arm has a single connection to the trim tab. In this embodiment, the trim tab has a cut-out that allows it to move past the trim tab.

In an alternative embodiment, the trim tab apparatus 10 comprises a single arm 30, pivotally attached to the trim tab planes, for example, as shown in FIG. 2. In one embodiment, the trim tab plane 20 can comprise a longitudinal slot 28 at least as long as and in the direction of the single arm 30. In this embodiment, shown in FIG. 2, the arm 30 is pivotally attached within and at or near the aft end of the shaft, such that when the fore end 100 of the trim tab plane is rotated upwards or downwards, the arm rotates within and passes through the slot 28.

An arm 30 of the subject invention can be connected to a vessel by any of a variety of techniques known to those with skill in the art. In one embodiment, the second end 34 one or more arms are attached directly to the vessel and extend from the vessel hull to a trim tab plane. In an alternative embodiment, the second end 34 one or more arms are attached to at least one bracket 40, as shown, for example, in FIGS. 1 and 2. The bracket 40 can be attached to the vessel hull by any means known to a skilled person.

Figure 3:
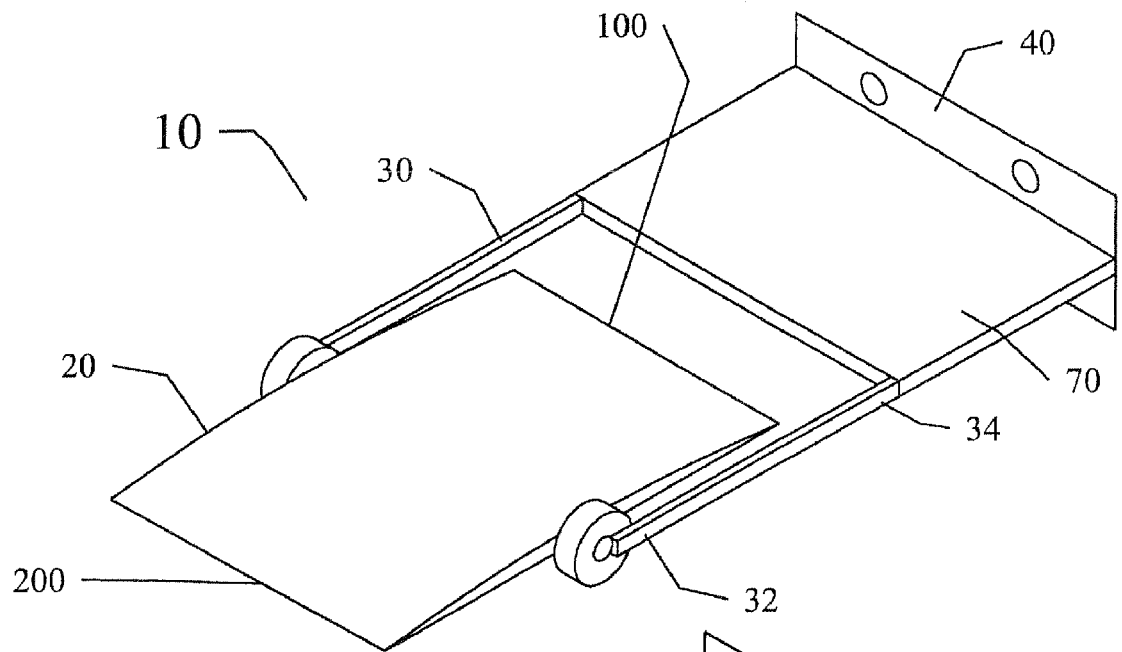
FIG. 3 is an illustration of an alternative embodiment of the trim tab in FIG. 1 where the trim tab arms are affixed to an extension bracket.
Figure 4:
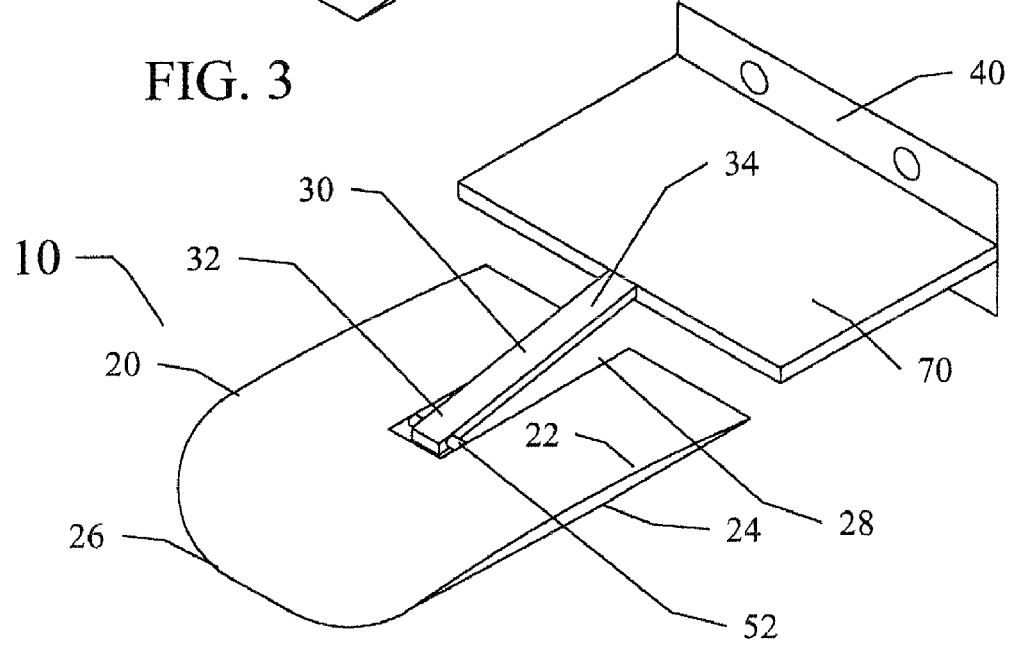
FIG. 4 is an illustration of an alternative embodiment of the trim tab in FIG. 2 where the trim tab arm is affixed to an extension bracket.

In an alternative embodiment, shown, for example, in FIGS. 3 and 4, the second end 34 of the arms 30 can be fixedly attached to an extension plate 70. As seen in FIGS. 3 and 4, attachment to the extension plate 70 locates the trim tabs of the subject invention further from the hull of the vessel. In a further embodiment, the extension plate 70 can be fixedly attached to a bracket 40 for attachment to a vessel.

The forces exerted on a trim tab apparatus 10 can be considerable depending upon the vessel speed and/or the angle of rotation of the trim tab plane. Preferably, the trim tab apparatus 10 has sufficient rigidity to withstand the forces exerted against it in any of a fore, aft, upwards, or downwards direction to provide the desired lift or stern-drag. In further embodiment, the trim tab apparatus comprises one or more marine grade materials of sufficient rigidity.

Rotation of the trim tab plane can be accomplished by any of a variety of devices and techniques known to those with skill in the art. Preferably, the means for rotating the trim tab plane is in operable connection with a control mechanism onboard the vessel. Such operable connection may be direct, or indirect, physical or remote. A person having benefit of the subject disclosure and skill in the art would be able to devise any of a variety of devices and techniques for rotating a trim tab plane of the subject invention such that the trim tab is rotated in either direction above or below the water's surface as desired, depending on whether stern lift or stern drag is desired. It is contemplated that any and all such variations in techniques and devices are within the scope of the subject invention.

It should be understood that the examples and embodiments described herein are for illustrative purposes only and that various modifications or changes in light thereof will be suggested to persons skilled in the art and are to be included within the spirit and purview of this application.

The invention claimed is:

1. A vessel trim tab apparatus comprising:
    at least one arm having a first end and a second end, wherein the second end is fixedly attached to a vessel;
    a trim tab plane having a top side and a bottom side, a fore end and an aft end, wherein the trim tab plane is pivotally attached to the at least one arm, such that in operation the fore end of the trim tab plane can rotate downwards, allowing water to flow over the top side of the trim tab plane, or rotate upwards, forcing the aft end of the trim tab plane deeper into the water, thereby increasing water flow across the bottom side of the trim tab plane;
    wherein the trim tab plane further comprises a longitudinal slot within the trim tab plane extending from the fore end towards the aft end, such that the at least one arm can be located and pivotally attached to the trim tab plane within the longitudinal slot, such that rotation of trim tab plane causes the arm to pass through the longitudinal slot.

2. The apparatus according to claim 1, further comprising two arms having a first end and a second end, wherein the first ends are pivotally attached to the trim tab apparatus and the second ends are fixedly attached to the vessel.

3. The apparatus according to claim 1, wherein the second end of the arm is attached to the vessel by a bracket.

4. The apparatus according to claim 2, wherein the second ends of the arms are attached to the vessel by at least one bracket.

5. The apparatus according to claim 1, wherein the trim b plane has a curvilinear top side.

6. The apparatus according to claim 1, wherein the trim tab plane has a curvilinear bottom side.

7. The apparatus according to claim 1, wherein the fore end and/or aft end comprise curvilinear edges.

8. The apparatus according to claim 3, further comprising an extension plate fixedly attached to the bracket, wherein the second end of the at least one arm is fixedly attached to the extension plate.

9. The apparatus according to claim 4, further comprising an extension plate fixedly attached to the bracket, wherein the second ends of the arms are attached to the extension plate.

10. The apparatus according to claim 1, wherein the pivotal attachment of the at least one arm is nearer to the fore end.

11. The apparatus according to claim 1, wherein the pivotal attachment of the at least one arm is nearer to the aft end.

* * * * *